(12) United States Patent
Siddall et al.

(10) Patent No.: US 10,572,937 B2
(45) Date of Patent: Feb. 25, 2020

(54) GENERATING IMPLIED ORDERS BASED ON ELECTRONIC REQUESTS FOR QUOTES

(75) Inventors: Jake Siddall, Chicago, IL (US); Dave Salvadori, Bartlett, IL (US); Paul Bauerschmidt, Glenview, IL (US); Ken Silhavy, Westmont, IL (US); Ari Studnitzer, Northbrook, IL (US); Paul Callaway, Chicago, IL (US); John Curran, Chicago, IL (US); Martin Stroup, Chicago, IL (US)

(73) Assignee: Chicago Mercantile Exchange Inc., Chicago, IL (US)

(*) Notice: Subject to any disclaimer, the term of this patent is extended or adjusted under 35 U.S.C. 154(b) by 0 days.

(21) Appl. No.: 12/817,610

(22) Filed: Jun. 17, 2010

(65) Prior Publication Data

US 2011/0313905 A1 Dec. 22, 2011

(51) Int. Cl.
*G06Q 40/00* (2012.01)
*G06Q 40/04* (2012.01)

(52) U.S. Cl.
CPC .................... *G06Q 40/04* (2013.01)

(58) Field of Classification Search
CPC ................................................ G06Q 40/00
USPC .............. 705/1.1, 37, 36 R, 35, 4, 30, 26.1; 726/26; 713/186; 709/246; 235/385
See application file for complete search history.

(56) References Cited

U.S. PATENT DOCUMENTS

| | | | |
|---|---|---|---|
| 5,560,029 A | 9/1996 | Papadopoulos et al. | |
| 7,260,554 B2 | 8/2007 | Morano et al. | |
| 7,337,140 B2 | 2/2008 | Brady et al. | |
| 7,389,264 B2 | 6/2008 | Kemp, II et al. | |
| 7,499,881 B2 | 3/2009 | Henninger et al. | |
| 7,742,976 B1 | 6/2010 | Burns et al. | |
| 7,921,046 B2 | 4/2011 | Parsons et al. | |
| 8,024,255 B2 | 9/2011 | Anguish et al. | |
| 8,060,421 B1 | 11/2011 | Wang | |
| 8,229,835 B2 | 7/2012 | Milne et al. | |
| 8,458,081 B2 | 6/2013 | Parsons et al. | |
| 8,595,104 B2 | 11/2013 | Parsons et al. | |
| 8,655,764 B2 | 2/2014 | Parsons et al. | |
| 8,768,805 B2 | 7/2014 | Taylor et al. | |
| 2002/0049667 A1 | 4/2002 | Navani et al. | |
| 2002/0091617 A1 | 7/2002 | Keith | |
| 2003/0069830 A1 | 4/2003 | Morano et al. | |
| 2003/0177086 A1 | 9/2003 | Gomber et al. | |

(Continued)

OTHER PUBLICATIONS

Edwards, Stephen; Kingsley, Lawrence; Votsch, Victor; Walter! Mark Seybold Report on Internet Publishing—(NPL—"How the Web is Changing Printing"); Sep. 1997.*

(Continued)

*Primary Examiner* — John H. Holly
(74) *Attorney, Agent, or Firm* — Lempia Summerfield Katz LLC (57) ABSTRACT

Systems and methods for determining implied spreads are provided. More particularly, implied spread financial transactions are generated using information from requests for quotes (RFQs). An RFQ processor module may focus the calculations performed by an implied spread determination module. A financial instrument associated with an RFQ may be provided to the implied spread determination module to trigger the determination of whether implied orders exist related to that particular financial instrument.

17 Claims, 4 Drawing Sheets

(56) References Cited

U.S. PATENT DOCUMENTS

| | | |
|---|---|---|
| 2003/0200167 A1 | 10/2003 | Kemp, II et al. |
| 2004/0143725 A1 | 7/2004 | Addison |
| 2005/0080734 A1 | 4/2005 | Lynch et al. |
| 2005/0203826 A1 | 9/2005 | Farrell et al. |
| 2006/0253376 A1 | 11/2006 | Seale et al. |
| 2007/0078749 A1* | 4/2007 | Burns ............... G06Q 40/00 705/37 |
| 2007/0100732 A1 | 5/2007 | Ibbotson et al. |
| 2007/0294157 A1 | 12/2007 | Singla et al. |
| 2008/0015970 A1* | 1/2008 | Brookfield ............ G06F 9/52 705/37 |
| 2008/0086405 A1 | 4/2008 | Sundaram et al. |
| 2008/0148274 A1 | 6/2008 | Accapadi et al. |
| 2008/0243675 A1 | 10/2008 | Parsons et al. |
| 2009/0327153 A1 | 12/2009 | Milne |
| 2010/0017321 A1* | 1/2010 | Callaway ............ G06Q 40/04 705/37 |
| 2011/0178912 A1 | 7/2011 | Parsons et al. |
| 2012/0084195 A1 | 4/2012 | Bauerschmidt et al. |

OTHER PUBLICATIONS

NPL Search History.*
PCT International Search Report, PCT/US 11/40423, mailed Sep. 14, 2011, 10 pages.
Definition for "tick" downloaded from <http://www.cftc.gov/consumerprotection/educationcenter/cftcglossary/glossary_t> on Jan. 28, 2013.
Definition for "tick" downloaded from <http://www.nasdaq.com/investing/glossary/t/tick> on Jan. 29, 2013.
Patent Examination Report No. 1 in AU2011268448 dated Oct. 22, 2013.
International Preliminary Report on Patentability, PCT/US2009/038791, dated Jan. 27, 2011, 6 pages.
"Sources: CME Looking at Liffe Connect Platform", Securities Industry News, SourceMedia, Inc. 2003, High Beam Research, Feb. 18, 2011, <http:///www.highbeam.com.>.
Cattle Futures and Options, © 2007 CME Group, 2 pages.
"The Nitty-Gritty of Executing a Trade", <http://www.investopedia.com/articles/03/012403.asp, 3 pages, downloaded Feb. 24, 2008.
"Understanding Order Execution", <http://www.investopedia.com/articles/01/022801.asp, 3 pages, downloaded Feb. 24, 2008.
"The Basics of Order Entry", <http://investopedia.com/articles/basics/034/032103.asp>, 3 pages, downloaded Feb. 24, 2008.
Implied Bid or Offer Functionality Returns to Nymex Access, <www.nymex.com/notice_to_member.aspx?id=ntm344&archive=2000, 1 page, downloaded Feb. 24, 2008.
Electronic Trading Platform Reference Manual, Liffe Connect Version 9.0 CBOT; © 2006 Board of Trade of the City of Chicago, Inc., 122 pages.
Implied Price Functionality Overview; © 2007 CME Group, 12 pages.
Developing and Certifying Your Application to CME Globex®, CME Globex Account Management, Version 3.0, 13 pages, downloaded Feb. 23, 2008.
Market Data Platform Fix/Fast, Nymex® Futures on the CME Globex® Platform, Version 1, Release, Sep. 14, 2007, 11 pages.
International Search Report from International Application No. PCT/US09/38791 dated May 8, 2009, 2 pages.
"Sources: CME Looking at Liffe Connect Platform", Security Industry News dated Nov. 17, 2003, http://www.highbeam.com/doc/1G1-110211996.html, downloaded Feb. 18, 2011, 3 pages.
Oct. 28, 1994, Wilson, Gregory, "The History of the Development of Parallel Computing", (Year: 1994), 20 pp.
May 8, 2009—(PCT)—International Search Report—App. PCT/US09/38791, 6 pages.
Jan. 27, 2011 (PCT)—IPRP—App. PCT/US2009/038791.
Oct. 22, 2013 (AU)—Office Action—2009271562.
Jan. 15, 2014 (US)—Office Action—U.S. Appl. No. 12/176,130.
Feb. 17, 2015—(AU) Examination Report No. 2—App. 2009271562—4 pages.
Sep. 9, 2015 (US)—Final Office Action—U.S. Appl. No. 12/176,130.
Dec. 8, 2016—(CA) Office Action—App. 2,730,829.
Nov. 17, 2016 (US)—Office Action—U.S. Appl. No. 12/176,130.
Aug. 23, 2017 (US)—Final Office Action—U.S. Appl. No. 12/176,130.
Oct. 18, 2017—(CA) Office Action—App. 2,730,829.
Jul. 12, 2018—(US) Office Action—U.S. Appl. No. 12/176,130.
BM&F, Swap Margin Calculation Criteria, downloaded Oct. 30, 2009, 12 pages.
Definition for "tick" downloaded form <http://www.nasdag.com/investing/glossary/t/tick>, downloaded on Jan. 29, 2013, 3 pages.
Definition for"tick", US Commodity Futures Trading Commission, downloaded from <http://www.cftc.gov/consumerprotectoin/educationcenter/cftcgglossary; glossary_t, downloaded Jan. 28, 2013, 3 pages.
Derivative Instruments, © 1997-2003 by Montego Data Limited, downloaded Nov. 5, 2007, 8 pages.
Developing and Certifying Your Application to CME Globex®, CME Globex Account Management, Version 3:0, downloaded Feb. 23, 2008, 13 pages.
Downes, John et al., Dictionary of Finance and Investment Terms, 7th Edition (copyright year: 2006), 3 pp.
Electronic Trading Platform Reference Manual Version 2.1.1, Liffe Connect Version 9.0 CBOT, © 2006, Board of Trade of City of Chicago, Inc., 122 pages.
File History—U.S. Appl. No. 12/649,267 filed Dec. 29, 2009, dated Aug. 7, 2012 as U.S. Pat. No. 8,239,308.
File History—U.S. Appl. No. 12/817,610, filed Jun. 17, 2010.
Gale Group Computer © 2013, Gale/Cengage, Roll over, Gutenberg: how the Web is changing printing, Edwards, Stephen; Kinglsey, Lawrence; Votsch, Victor; Walter, Mark, Seybold Report on Internet Publishing v. 2, N1, Sep. 1997, pp. 1-20.
How the Euronext.liffe Markets Work, © Aug. 2004, 32 pages.
Implied Bid or Offer Functionality Returns to Nymex Access, www.nymex.com/notice_to_member.aspx?id=ntm3448,archieve=2000, © 2006, downloaded Feb. 24, 2008, 1 page.
Implied Price Functionality Overview, ® CME Group, 12 pages.
Interest rate swap, http://en.wikipedia.org/wiki/Interest_rate_swap, downloaded Oct. 30, 2009, 7 pages.
Market Data Plafform Fix/Fast, Nymex® Futures on the CME Globex® Platform, Version 1.0, Release: Sep. 14, 2007, 11 pages.
Market Data Platform Fix/Fast; Core Functionality Version 1.1 Release: Oct. 31, 2007, 84 pages.
Market Data Platform, Nymex® Futures on the CME Globex® Platform, Version 1.2, Release: Aug. 6, 2007, 33 pages.
The Basics of Order Entry, http://investopedia.com/articles/basics/034/032108.asp, downloaded Feb. 24, 2008, 3 pages.
Understanding Order Execution, http://www.investopedia.com/articles/01/022801.asp, downloaded Feb. 24, 2008, 3 pages.
Yield Curve, http://en.wikipedia.org/wiki/Yield_curve, downloaded Oct. 30, 2009, 8 pages.

* cited by examiner

GENERATING IMPLIED ORDERS BASED ON ELECTRONIC REQUESTS FOR QUOTES

RELATED APPLICATION

This application is related to U.S. application Ser. No. 12/176,130, filed Jul. 18, 2008, entitled "Adaptive Implied Spread Matching," and which is herein incorporated by reference in its entirety.

TECHNICAL FIELD

The present disclosure generally relates to systems and methods that are utilized in connection with the electronic trading of financial instruments. More particularly, implied spread financial transactions may be generated using information from requests for quotes.

DESCRIPTION OF THE RELATED ART

Traders often desire to trade multiple financial instruments in combination. Each component of the combination is called a leg. Traders can define the combination (e.g., an exchange-defined combination) and submit orders for each leg or in some cases can submit a single order for multiple financial instruments. Such orders may be called a strategy order, a spread order, or a variety of other names. The counter party orders that are matched against such a combination order may be individual, "outright" orders or may be part of other combination orders. In the case of spread orders, the matching system may imply the counter party order by using multiple orders to create the counter party order. Examples of spreads include implied IN, implied OUT, 2nd- or multiple-generation, crack spreads, straddle, strangle, butterfly, and pack spreads.

Implied IN spread orders are derived from existing outright orders in individual legs. Implied OUT outright orders are derived from a combination of an existing spread order and an existing outright order in one of the individual underlying legs. Implied orders can fills in gaps in the market and allow spreads and outright futures traders to trade in a product where there would otherwise have been little or no available bids and asks. Thus, the liquidity of the product is enhanced by the use of implied orders.

A spread is an order for the price difference between two contracts. This results in the trader holding a long and a short position in two or more related futures or options on futures contracts, with the objective of profiting from a change in the price relationship. A butterfly spread is an order for two inter-delivery spreads in opposite directions with the center delivery month common to both spreads. A calendar spread, also called a intra-commodity spread, for futures is an order for the simultaneous purchase and sale of the same futures contract in different contract months. (i.e., buying a September CME S&P 500® futures contract and selling a December CME S&P 500 futures contract). A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. Also the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading includes those disclosed in U.S. patent application Ser. No. 10/986,967, entitled "Implied Spread Trading System," which is incorporated herein by reference.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. Implied IN or implied OUT spreads may be created when an electronic match system simultaneously works synthetic spread orders in spread markets and synthetic orders in the individual leg markets without the risk to the trader/broker of being double filled or filled on one leg and not on the other leg.

Large exchanges typically have order books for numerous spread products and legs of the spread products. However, the identification and processing of potential implied spreads inside electronic trade systems consumes valuable processing resources that could otherwise be used to process outright orders. In a typical central limit order book implementation, the system component for receiving electronic trades from users appears as a single processing thread with a single point of control. In such an implementation, there is a requirement that one order matches only another order, and does not result in two competing processes both matching different orders against a single order. Therefore, implementations have been limited in such trading systems.

In addition, traders (and others) may submit a request for quote (RFQ) to an exchange. RFQs are similar to orders submitted to an exchange, however, RFQs differ significantly from an order in that an RFQ is not binding and not actionable. RFQs are well known in the art and commonly used by traders, clearinghouses, and/or exchanges to inquire as to the current market for a particular financial instrument. RFQs, however, are sometimes abused. For example, a trader may flood the market with RFQs in an attempt to ascertain other traders' positions on particular financial instruments without binding himself to an order. Those that respond to RFQs (e.g., market makers, other traders, etc.) may disregard the RFQs due to the enormous quantity of RFQs. Unfortunately, a non-abusive RFQ may be left unresponded to because of such behavior. Furthermore, in some scenarios, market makers, which although they are under a contractual obligation to respond to RFQs, may still be less than diligent in responding to RFQs, thus resulting in a negative perception of an exchange.

Therefore, there exists a need for enhanced systems and methods to address one or more of these and other deficiencies in the art.

BRIEF SUMMARY

Aspects of the invention overcome at least some of the above problems and limitations by providing systems and methods for using request for quotes (RFQs) to assist in detecting implied orders, and disseminating responses to RFQs to a user community. Systems and methods for receiving a RFQ using a request for quote processor module, and sending some information from the RFQ for use by an implied spread determination module. An example includes a system with a processor and memory storing a search list and computer-executable instructions, where the instructions determine whether the financial instrument associated with a RFQ is on the search list and then use the financial instrument to determine if an implied order exists in combination with that financial instrument. In some embodiments, a timer may be used to track a predetermined amount of time before a RFQ processor module may submit information to determine if implied orders exist.

In some embodiments, aspects of the invention may be implemented on a computer-readable medium, for example, by storing computer-executable instructions or modules, or by utilizing computer-readable data structures. Of course, the methods and systems of the above-referenced embodiments may also include other additional elements, steps, computer-executable instructions, or computer-readable data structures. For example, one skilled in the art will recognize that the various modules described herein may be implemented using programming code (e.g., C++, C, Java, etc.) and be associated with a processor on a computing device that may execute the module. The programming code may include common elements of software programming, such as "for loops", "do-while loops", function calls, if-else syntax, "switch" syntax, and other well known elements. While programming code has not been provided for each of the various modules, one skilled in the art after review of the entirety disclosed herein will appreciate that such programming code may be authored without requiring undue experimentation.

Numerous embodiments are disclosed and claimed herein. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

Aspects of the disclosure may take physical form in certain parts and steps, embodiments of which will be described in detail in the following description and illustrated in the accompanying drawings that form a part hereof, wherein.

DETAILED DESCRIPTION

The present disclosure generally relates to systems and methods that are utilized in connection with the electronic trading of financial instruments. More particularly, implied spread financial transactions are generated using information from requests for quotes (RFQs). In an attempt to, inter alia, enhance efficiency of implied order generation, an RFQ processor module may be used to focus the calculations performed by an implied spread determination module. A financial instrument associated with an RFQ may be provided to the implied spread determination module to trigger the determination of whether implied orders exist related to that particular financial instrument.

Figure 1:
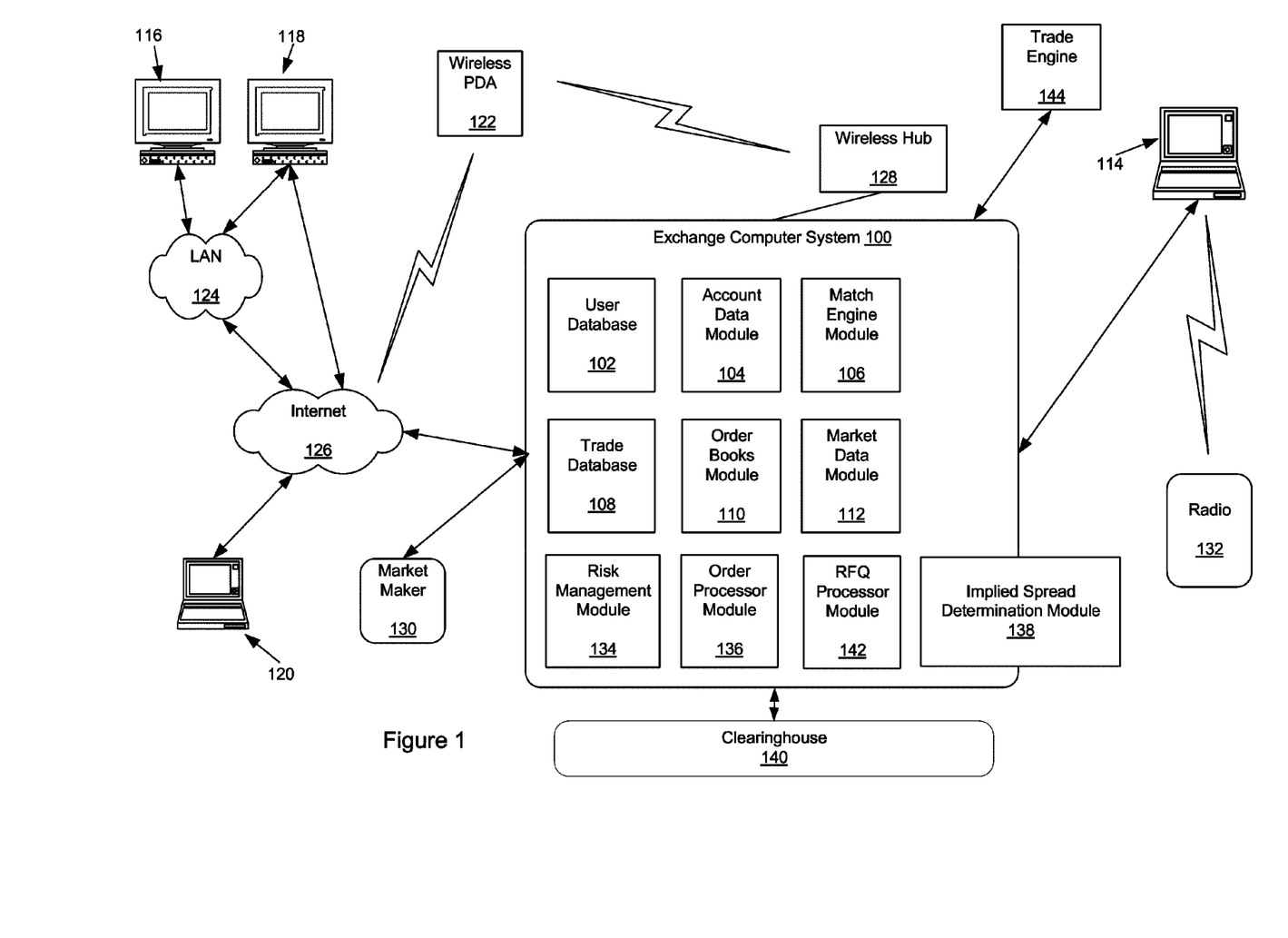
FIG. 1 shows a computer network system that may be used to implement aspects of the disclosure.

FIG. 1 depicts an illustrative operating environment that may be used to implement various aspects of the disclosure. The operating environment is only one example of a suitable operating environment and is not intended to suggest any limitation as to the scope of use or functionality of the disclosure. Aspects of the present disclosure are preferably implemented with computing devices and networks for exchanging, transmitting communicating, administering, managing and facilitating trading information including, but not limited to performance bond amount requirements and trading information. An exchange computer system 100 may receive market data, analyze historical data, and/or calculate various values, e.g., performance bond amounts, in accordance with aspects of the disclosure.

Exchange computer system 100 may be implemented with one or more mainframes, servers, gateways, controllers, desktops or other computers. The exchange computer system 100 may include one or more modules, processors, databases, mainframes, desktops, notebooks, tablet PCs, handhelds, personal digital assistants, smartphones, gateways, and/or other components, such as those illustrated in FIG. 1. Moreover, computer system 100 may include one or more processors (e.g., Intel® microprocessor, AMDO microprocessor, RISC processor, a 64-bit processor, etc.) and one or more memories (e.g., solid state, DRAM, SRAM, ROM, Flash, non-volatile memory, hard drive, registers, buffers, etc.)

In addition, an electronic trading system 144, such as the Globex® trading system, may be associated with an exchange 100. In such an embodiment, the electronic trading system includes a combination of globally distributed computers, controllers, servers, networks, gateways, routers, databases, memory, and other electronic data processing and routing devices. One skilled in the art will appreciate that numerous additional computers and systems may be coupled (i.e., in operative communication) to exchange computer system 100. Such computers and systems may include clearing, regulatory and fee systems, such as clearinghouse 140. The trading system may include a trading system interface having devices configured to route incoming messages to an appropriate devices associated with the trading system. The trading system interface may include computers, controllers, networks, gateways, routers and other electronic data processing and routing devices. Orders that are placed with or submitted to the trading system are received at the trading system interface. The trading system interface routes the order to an appropriate device. An exchange computer system 100 receives orders and transmits market data related to orders and trades to users. In another example, the trade engine 144 may be configured to process orders for instruments associated with another exchange or third party electronic trade matching system.

A user database 102 may include information identifying traders and other users of exchange computer system 100. Such information may include user names and passwords. A trader operating an electronic device (e.g., computer devices 114, 116, 118, 120 and 122) interacting with the exchange 100 may be authenticated against user names and passwords stored in the user database 112. Furthermore, an account data module 104 may process account information that may be used during trades. The account information may be specific to the particular trader (or user) of an electronic device interacting with the exchange 100.

A match engine module 106 may match bid and offer prices for orders configured in accordance with aspects of the disclosure. Match engine module 106 may be implemented with software that executes one or more algorithms for matching bids and offers for bundled financial instruments in accordance with aspects of the disclosure. The match engine module 106 and trading system interface may be separate and distinct modules or component or may be unitary parts. Match engine module may be configured to match orders submitted to the trading system. The match engine module may match orders according to currently known or later developed trade matching practices and processes. In an embodiment, bids and orders are matched on price, on a FIFO basis. The matching algorithm also may match orders on a pro-rata basis or combination of FIFO and pro rata basis. Other processes and/or matching processes may also be employed. The match engine module 106, after executing matching trades, may also report on the last price for a financial instrument.

Moreover, a trade database 108 may be included to store historical information identifying trades and descriptions of trades. In particular, a trade database may store information identifying or associated with the time that an order was executed and the contract price. The trade database 108 may also comprise a storage device configured to store at least part of the orders submitted by electronic devices operated by traders (and/or other users). A confirmation message may be sent when the match engine module 106 finds a match for an order and the order is subsequently executed. The confirmation message may, in some embodiments, be an e-mail message to a trader, an electronic notification in one of various formats, or any other form of generating a notification of an order execution.

Furthermore, an order book module 110 may be included to compute or otherwise determine current bid and offer prices. The order book module 110 may be configured to calculate the price of a financial instrument. Also, a market data module 112 may be included to collect market data and prepare the data for transmission to users. In addition, a risk management module 134 may be included in computer system 100 to compute and determine the amount of risk associated with a financial product or portfolio of financial products. An order processor module 136 may be included to receive data associated with an order for a financial instrument. The module 136 may decompose delta based and bulk order types for processing by order book module 110 and match engine module 106. The order processor module 136 may be configured to process the data associated with the orders for financial instruments.

Similar to an order processor module 136, a request for quote (RFQ) processor module 142 may receive requests for quotes (RFQs) from traders operating computer devices 114, 116, 118, 120, 122. The RFQ processor module 142 may also receive RFQs from other sources, including, but not limited to the exchange and/or clearinghouses 140. RFQs may include information about the terms related to a financial instrument, such as price, instrument identifier, expiration date (in the case of an options contract), and other terms known to those skilled in the art. The RFQ processor module 142 may receive the RFQ and communicate with market makers 130 and/or traders to obtain a response to the RFQ. For example, the RFQ processor module 142 may broadcast RFQs to subscribers (e.g., market makers 130, traders, etc.) to inform them that quotes are requested on particular financial instruments. In some instances no response may be obtained and the RFQ may remain unanswered. In other embodiments, the RFQ processor module 142 may be able to provide information to the requesting entity/individual (e.g., a trader).

Exchange computer system 100 may also include an implied spread determination module 138. The implied spread determination module 138 may be used to determine if an order in combination with one or more pending unmatched orders (i.e., resting orders) in an order book creates an implied spread. The implied spread determination module 138 may perform the determination in parallel with and/or apart from the electronic match engine 106 in the exchange. Furthermore, as graphically depicted in FIG. 1, the implied spread determination module 138 may be located inside or outside the exchange computer system 100. For example, the implied spread determination module 138 may be located in a remote computer system 120 outside the exchange computer system 100. In another embodiment, the module 138 may have multiple instances running inside and outside the exchange. One skilled in the art will recognize that the implied spread determination module 138 may be implemented using programming code (e.g., C++, C, Java, etc.) and executed on a processor located in a computing device. The programming code may include common elements of software programming, such as "for loops", "do-while loops", function calls, if-else syntax, "switch" syntax, and other well known elements. Similar such programming code may be found in the various other modules and computer-readable instructions described throughout the disclosure.

The trading network environment shown in FIG. 1 includes computer (i.e., electronic) devices 114, 116, 118, 120 and 122. The computer devices 114, 116, 118, 120 and 122 may include one or more processors, or controllers, that control the overall operation of the computer. The computer devices 114, 116, 118, 120 and 122 may include one or more system buses that connect the processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device. For example the electronic device may be a personal computer, laptop or handheld computer, tablet pc and like computing devices having a user interface. The electronic device may be a dedicated function device such as personal communications device, a portable or desktop telephone, a personal digital assistant ("PDA"), remote control device, personal digital media system and similar electronic devices.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network (LAN) 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

The operations of computer devices and systems shown in FIG. 1 may be controlled by computer-executable instructions stored on computer-readable storage medium. Embodiments also may take the form of electronic hardware, computer software, firmware, including object and/or source code, and/or combinations thereof. Embodiment may be stored on computer-readable media installed on, deployed by, resident on, invoked by and/or used by one or more data processors (e.g., 64-bit processor), controllers, computers, clients, servers, gateways, networks of computers, and/or any combinations thereof. The computers, servers, gateways, may have one or more controllers configured to execute instructions embodied as computer software. For example, computer device 114 may include computer-executable instructions for receiving interest rate and other information from computer system 100 and displaying to a user. In another example, computer device 118 may include computer-executable instructions for receiving market data from computer system 100 and displaying that information to a user. In yet another example, a processor of computer system 100 may be configured to execute computer-executable instructions that cause the system 100 to calculate a performance bond amount required to balance risk associated with a portfolio.

One or more market makers 130 may maintain a market by providing bid and offer prices for a derivative or security to exchange computer system 100. Exchange computer system 100 may also exchange information with other trade engines, such as trade engine 144.

A clearinghouse 140 enables an exchange computer system 100 to provide contracts with a lower likelihood of default than over-the-counter (OTC) products. A clearinghouse 140 arranges for transactions to be settled and cleared. Clearing is the procedure through which a clearinghouse 140 becomes buyer to each seller of a contract (e.g., futures contract, equities, currencies, interest rate products, etc.), and seller to each buyer, and assumes responsibility for protecting buyer and seller from financial loss by assuring performance on each contract. A clearinghouse 140 may settle trading accounts, clear trades, collect and maintain performance bond funds, regulate delivery and report trading data. In some scenarios an exchange may operate its own clearinghouse 140 through a division of the exchange through which all trades made are confirmed, matched, and settled each day until offset or delivered. Alternatively, one or more other companies may be provided the responsibility of acting as a clearinghouse 140 with the exchange (and possibly other exchanges). An exchange may have one or more clearinghouses associated with the exchange. An exchange may offer firms qualified to clear trades to provide a clearinghouse 140 for the exchange computer system 100. In some instances, these clearing members may be designated into different categories based on the type of commodities they can clear and other factors.

The clearinghouse 140 may establish minimum performance bond (i.e., margin) requirements for the products it handles. A customer may be required to deposit a performance bond with the clearinghouse 140 (or designated account) for the purpose of insuring the clearinghouse 140 against loss on open positions. The performance bond helps ensure the financial integrity of brokers, clearinghouses, and exchanges as a whole. If a trader experiences a drop in funds below a minimum requirement, the clearinghouse 140 may issue a margin call requiring a deposit into the margin account to restore the trader's equity. A clearinghouse 140 may charge additional performance bond requirements at the clearinghouse's discretion. For example, if a clearinghouse's potential market exposure grows large relative to the financial resources available to support those exposures, the clearinghouse 140 may issue a margin call.

In another embodiment, the clearinghouse 140 may require a larger performance bond based on a credit check (e.g., an analysis of the credit worthiness, such as using a FICO™ or comparable score, inter alia) of the customer/trader. The credit check may be performed (i.e., initiated) by a clearinghouse 140 or an exchange 100. In the example where the clearinghouse 140 performs the credit check, the clearinghouse 140 may send a message (e.g., enforcement message) to the exchange 100. If the credit check indicates that a customer/trader is a high risk, the enforcement message may increase the margin requirements of the customer/trader, or otherwise adjust the capabilities/constraints of the customer/trader commensurate with the higher risk. In the example where the exchange 100 initiates the credit check, the exchange 100 may send a message to one or more clearinghouses associated with the exchange 100 to update them on the increased/decreased risk associated with the customer/trader.

In recognition of the desire to promote efficient clearing procedures and to focus on the true intermarket risk exposure of clearinghouses, a cross-margining system may be used. By combining the positions of joint and affiliated clearinghouses in certain broad-based equity index futures and options into a single portfolio, a single performance bond requirement across all markets may be determined.

The cross-margining system may greatly enhance the efficiency and financial integrity of the clearing system.

The principal means by which a clearinghouse 140 mitigates the likelihood of default is through mark-to-market (MTM) adjustments. The clearinghouse 140 derives its financial stability in large part by removing debt obligations among market participants as they occur. Through daily MTM adjustments, every contract is debited or credited based on that trading session's gains or losses. For example, as prices move for or against a position, funds flow into or out of the trading account. This cash flow is known as settlement variation.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Figure 2:
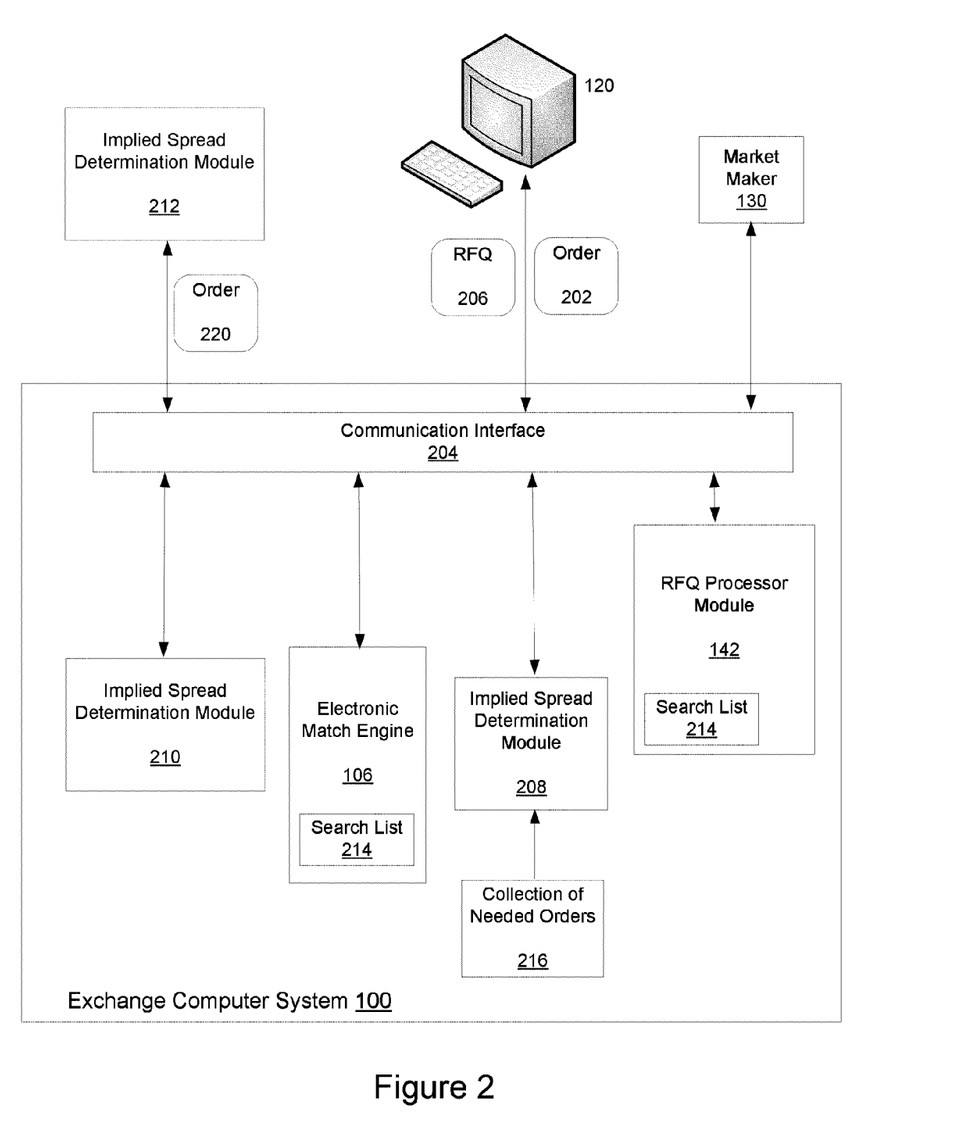
FIG. 2 shows a system that may be used to match orders in accordance with an embodiment of the disclosure.
Figure 3:
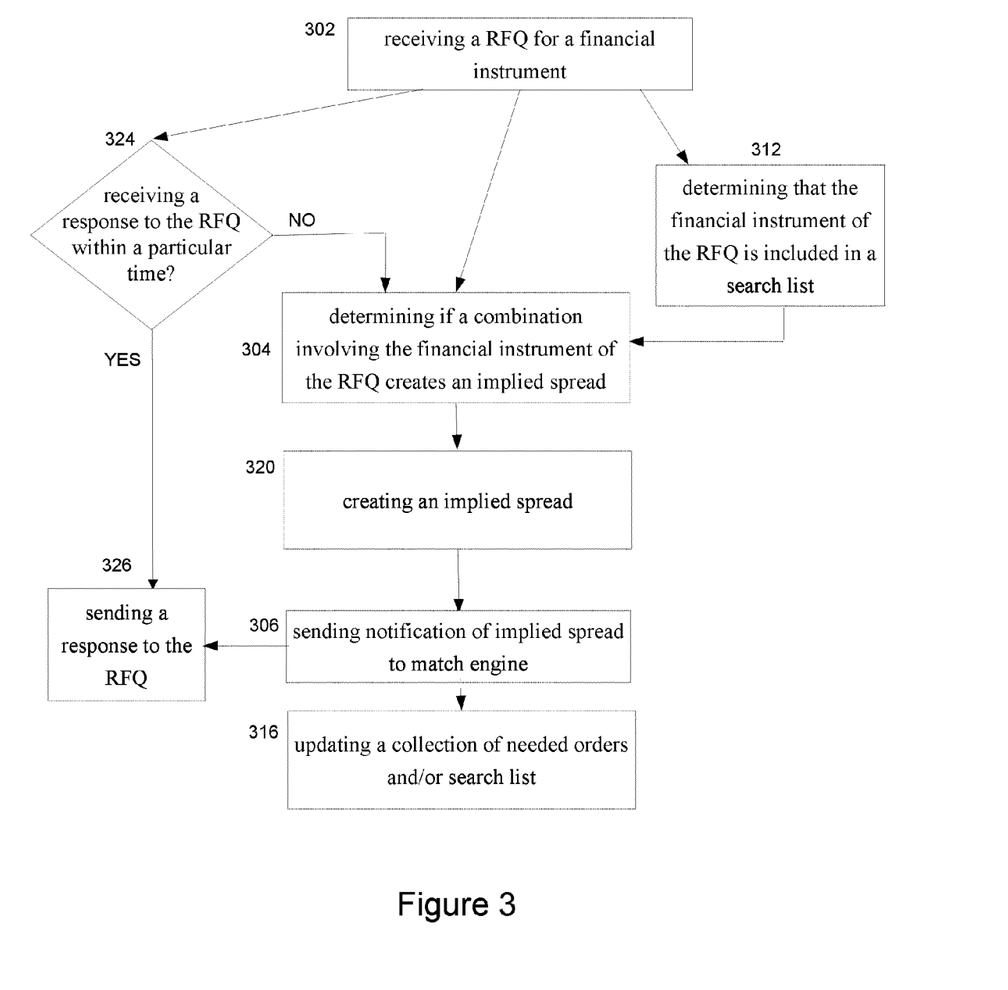
FIG. 3 illustrates a method for identifying implied spreads, in accordance with an embodiment of the disclosure.

FIG. 2 shows a system that may be used to match orders in accordance with an embodiment of the disclosure. In one embodiment, the system of FIG. 2 may be used to receive new orders 202 that are used to focus an implied spread determination module 138 on particular financial instruments for which implied spread orders may exist. In another embodiment in accordance with the disclosure, the system of FIG. 2 may be used to direct an implied spread determination module 138 as to which financial instruments to perform analysis on to determine if implied spread orders may exist. Along these lines, FIG. 3 illustrates a method for determining implied spreads in accordance with various embodiments of the disclosure; in particular, FIG. 3 shows a method for using a request for quote (RFQ) to focus the computations involving in identifying existing implied orders on order books.

In accordance with one embodiment of the disclosure, a new order 202 for a financial instrument may be received at an exchange computer system 200. The new order 202 may be an outright order for a single futures contract or any other financial product (e.g., an options contract, a derivative product, security, bond, etc.) Alternatively, the new order 202 may be a spread order with a butterfly, crack, or other configuration. The new order 202 may be received at communication interface 204 in exchange computer system 100. In one embodiment, the communication interface 204 may be an input/output (I/O) port on a communications card (e.g., an Ethernet card) on a computing device at the exchange computer system 100. Alternatively, the communication interface 204 may be in communication with a user's computing device 120 that permits the user to enter/select an order 220. One skilled in the arts will appreciate that the communication interface 204 may be used to communicate with a variety of devices and/or modules inside or outside an exchange.

The new order may be sent to an implied spread determination module 208 to determine if the new order in combination with one or more pending orders creates an implied spread. Meanwhile, the new order 202 may also be nearly simultaneously submitted to the electronic match engine 106 for processing. As described in greater detail in commonly assigned, U.S. patent application Ser. No. 11/617,915, entitled "Template Based Matching," which is herein incorporated by reference in its entirety, match engine module 106 may attempt to match new order 202 to data included in a collection of almost matched orders and pending orders included in various order books. The collection of almost matched orders and/or various order books may be stored in a memory accessible to a microprocessor used to implement a match engine.

Sometime during or after the time the electronic match engine 106 receives the new order, the implied spread determination module 208 may perform in parallel the step of determining if any implied spreads are created using the new order 202. Some benefits of such an embodiment include reduced match engine 106 workload and quicker response times from match engine 106. In addition, as depicted in FIG. 1 and FIG. 2, the implied spread determination module may be various locations. For example, an implied spread determination module 212 may executed at a remote computer outside the exchange. The remote computer may be a computer located physically outside an exchange, but controlled by the exchange. Alternatively, the remote computer may be a trader's computer 120. In yet another example, the implied spread determination module 210 may be running in a processing thread on a computer located inside the exchange and running in parallel with one or more other implied spread determination modules 208. Therefore, numerous implied spread determination modules 208, 210 may be running in parallel with each other (e.g., different modules may each be searching some portion or depth of the possible implied space). Moreover, the implied spread determination modules 210, 208, 212 may be running simultaneous with the electronic match engine 106. At least one benefit of such a parallel processing distributed architecture is the greater computational power available at a given time.

Referring to FIG. 3, a implied spread determination module 138 may determine (in step 304) if any implied spreads can be created involving the financial instrument of a request for quote (RFQ) 206 received in step 302. In one embodiment, order books are analyzed to generate a collection of needed orders 216 that each when combined with one or more existing orders meet the requirements of one of the acceptable trade templates. Trade templates are discussed in greater detail in commonly assigned, U.S. patent application Ser. No. 11/617,915, entitled "Template Based Matching," which was previously incorporated by reference in its entirety herein. The implied spread determination module 138 may compare any new orders 202 and pending orders related to the financial instrument of the RFQ 206 to the collection of needed orders 216. If any of these orders match one of the needed orders, the implied spread determination module 208 creates an implied spread.

The implied spread created (in step 320) by the implied spread determination module 208 may comprise multiple legs. For example, the implied spread may include a first leg corresponding to a new order 202 and a second leg corresponding to a pending order. In one example, the new order 202 may be the order that completes the unmatched leg of an implied spread awaiting a match. The number of legs in the implied spread may be dependent on the resources (e.g., amount of processing power and time) available to the implied spread determination module 208 to attempt to identify possible implied spreads.

After the implied spread determination module 208 determines that an implied spread exists, a notification may be sent (in step 306) through a communication interface 204 to the electronic match engine 106 informing the engine of the matching combination. The notification may comprise order book identifiers that permit the matching engine to, in one embodiment, verify that all legs of the implied spread are valid. For example, the identifiers may be used to check the appropriate order books to verify that the appropriate resting orders are still unmatched. One skilled in the art will appreciate that a communication interface 204 may include an input/output (I/O) port on a communications card (e.g., an Ethernet card) on a computing device at the exchange computer system 100. Alternatively, information may be sent through the communication interface 204 to an output device (e.g., a display monitor) to alert a user (e.g., manager) of an exchange that an implied match exists so the user may respond accordingly.

Using the information provided in the notification, the electronic match engine 106 matches (e.g., executes) all of the multiple legs of the implied spread. The execution (or the notification) may trigger the RFQ processor module 138 to send (in step 326) a response to the RFQ 206. For example, an RFQ may be received for a particular financial instrument with no current trading activity (i.e., no volume and/or illiquidity). The generation and matching/execution of the implied spread order that includes the particular financial instrument may create trading activity for the particular financial instrument. Such trading activity provides information (e.g., current trading price) that may be used to create the response to be sent in step 326.

Using the information provided in the notification, the plurality of trades that match the legs of the implied spread may be contemporaneously executed such that all of the trades are executed before a material change in the appropriate markets. The abundance of processing power at the electronic match engine 106 is at least one factor that permits the matching of the legs of the implied spread with minimal or no legging risk. For example, after an implied spread determination module 208 has identified the corresponding legs of an implied transaction, the electronic match engine 106 may execute the implied transaction inline without requiring a locking of the markets involved. In alternate embodiments, an exchange may lock one or more markets for the orders involved to eliminate possible legging risk.

The electronic match engine 106 may be configured to determine if a new order 202 or a pending order in combination with one or more pending orders for particular financial instruments creates an implied spread. In some embodiments, the electronic match engine 106 may limit the determination to only those financial instruments located in a search list 214. The search list 214 may comprise a plurality of financial instruments that are cleared to be monitored for determining implied spreads. The new order 202 may be compared to the search list 214 before determining if an implied spread is created. At least one benefit of such an embodiment is that it allows an exchange to restrict the electronic match engine 106 from searching a potentially unlimited number of new orders for implied spreads by focusing it on those financial instruments of new orders that it believes may be more conducive to an implied spread.

In another example in accordance with various aspects of the disclosure, the RFQ processor module 142 (or another comparable module) may determine (in step 312) if the financial instrument associated with an incoming RFQ 206 may be used to determine (in step 304) if an implied spread may be generated. In one example, a search list 214 may be used to further this determination (of step 312). The search list used by the RFQ processor module 142 may be the same or a different list as the search list used by the electronic match engine 106. If a match is found in the search list 214, the RFQ processor module 142 may be configured to submit a request to an implied spread determination module 138 (e.g., implied spread determination modules 212, 210, or 208) to determine (in step 304) if an implied spread may be generated using one or more pending orders for the particular financial instrument of the RFQ 206. One skilled in the art after review of the entirety disclosed herein will appreciate that at least one benefit of such an embodiment is that it allows an exchange to focus the potentially unlimited number of combinations that may possibly lead to implied spreads, thus enhancing efficiency of processing and/or memory consumption.

In one example, the search list 214 of RFQ processor module 142 may comprise a plurality of financial instruments (or a name of a predefined group of financial instruments) that are to be monitored to determine implied spreads. In an alternate embodiment, the search list 214 may be the inverse of the prior example. In other words, the search list 214 may comprise those financial instruments which the RFQ processor module 142 should exclude from acting as a trigger for determining implied spreads. At least one purpose of such an embodiment may be to prevent particular financial instruments with historically high liquidity from overloading the exchange computer system 100 and/or implied spread determination module 138. In yet another embodiment, the search list 214 may serve as a switch to turn on and turn off various functionality. For example, the search list 214 may be temporarily cleared when the generation of implied spreads is to be turned off. Accordingly, the search list 214 may act as a switch to prevent additional load on the system due to implied spread generation. The search list 214 may be restored (i.e., undoing the temporary clearing) when such functionality is desired to be turned on again.

Furthermore, in one embodiment in accordance with aspects of the disclosure, the search list may be updated (in step 316) based on the determining occurring in an implied spread determination module 138. As such, the search list may be an adaptive list that allows electronic match engine 106 to try to detect implied spreads where there is a higher probability of finding them. This may be determined based on past success, market conditions, submitted request for quotes (RFQs) and/or through monitoring activity of the implied spread determination module 138 and/or the electronic match engine 106 itself.

Likewise, the operation of an implied spread determination module 138 may be adjusted based on prior findings of implied spreads. For example, the collection of needed orders 216 may be updated (in step 316) based on the determination of implied spreads occurring in the implied spread determination module 208. As such, the collection of needed orders 216 may be dynamically adjusted to identify those financial instruments that have a higher probability of contributing to an implied spread. Like the search list 214, the adjustment may be based on past success, market conditions, submitted request for quotes (RFQs) and/or through monitoring activity. In one embodiment in accordance with various aspects of the disclosure, an implied spread determination module 138 may include its own search list. Such a search list may operate similar to search list 214 to enhance the operation of the implied spread determination modules 208, 210, 212.

Referring to FIG. 2, in another embodiment in accordance with various aspects of the disclosure, the RFQ processor module 142 may be configured to wait (in step 324) a predetermined amount of time before submitting a request (in step 324) to an implied spread determination module 138. For example, the RFQ processor module 142 may receive an RFQ 206 at time t1. A timer component in the RFQ processor module 142 may begin counting down from time t1 for a predetermined amount of time (e.g., 10 seconds, 30 seconds, 1 minute, 3 minutes, less than 5 minutes, etc.) until a response to the RFQ is received. If a response to the RFQ is received before the predetermined amount of time expires, then the RFQ response may be sent (in step 326) to the requesting entity/individual (e.g., a trader requesting a quote on a particular financial instrument). If no response is received within the predetermined time, the financial instrument associated with the RFQ may be submitted to an implied spread determination module 138. In some examples the RFQ processor module 142 may consult with a search list 214, as described above, before requesting the implied spread determination module 138 begin determining (in step 304) if implied orders exist. In some examples the RFQ processor module 142 may submit the financial instrument associated with the RFQ to an implied spread determination module 138 even if a response is received (e.g., from a market maker 130) within the predetermined amount of time.

In yet another embodiment in accordance with aspects of the disclosure, the implied spread determination module 138 may automatically stop calculations to determine (in step 304) if an implied order exists after a predefined amount of time has passed. For example, an implied spread determination module 138 may receive a financial instrument from RFQ processor module 142 at time t1. A timer in the implied spread determination module 138 may begin counting down starting at time t1 for a predefined amount of time (e.g., 0.5 seconds, 1 second, 5 seconds, 10 seconds, 30 seconds, less than 1 minute, etc.) and stop calculations once the timer expires. One skilled in the art will appreciate that a timer is just one way of calculating the passage of time and other components (e.g., counter, clock, adder, etc.) for accomplishing the function are contemplated by the term "timer." In addition, the aforementioned timer may be located in components outside of the implied spread determination module 138; for example, the timer may be located in the RFQ processor module 142, and upon expiration, the RFQ processor module 142 may instruct the particular implied spread determination module 138 to stop further calculations. One skilled in the art will appreciate after review of the entirety disclosed herein that at least one benefit of a timer to regulate the determination performed by the implied spread determination module 138 is that it reduces the stress/load on the system created by memory/processor intensive implied determination calculations.

Figure 4:
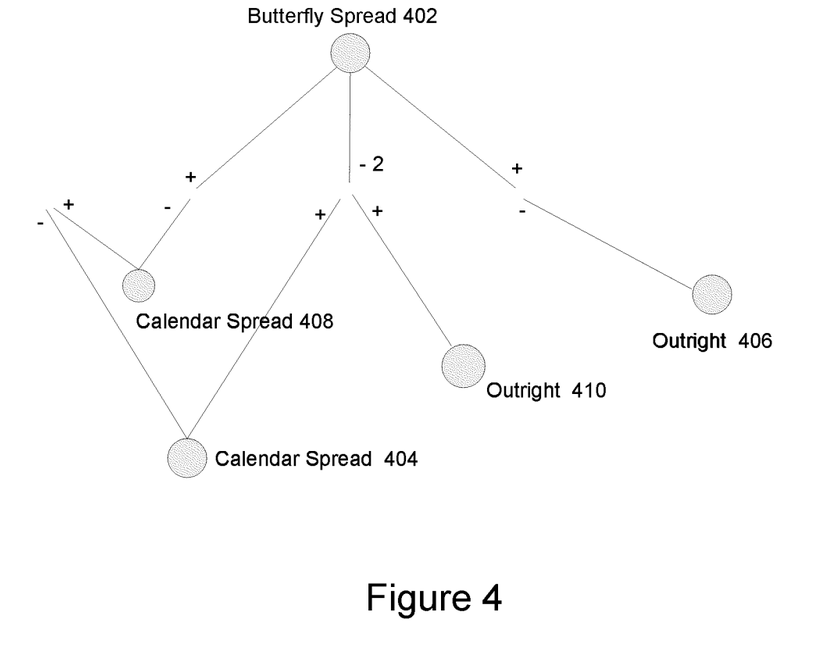
FIG. 4 shows a possible implied spread that consists of orders for a butterfly spread, two calendar spreads, and outright orders in accordance with an embodiment of the disclosure.

Referring to FIG. 4, an implied spread determination module 208 in accordance with various aspects of the disclosure may identify an implied spread for a new order 410 using pending spread orders 402, 404, 408, and an outright order 406. The new order may be an order to buy 9700 oil future call contracts. The implied spread determination module 138 may calculate that the legs of butterfly spread 402 may be combined with the legs of calendar spread 408 and calendar spread 404. In addition, the module 138 may calculate that one of the two remaining unmatched legs of the butterfly spread 402 may be filled by a pending outright order 406. The remaining unmatched leg may match an order to sell 9700 oil future call contracts. Therefore, the implied spread determination module 138 may send a notification to the electronic match engine 106 indicating that the combination of the pending orders 402, 404, 406, and 408 and new order 410 complete a match. The notification may include identifiers directing the match engine 106 to the appropriate order books to find the appropriate pending orders.

Such a notification may, in one embodiment in accordance with aspects of the disclosure, include order book identifiers without also including a copy of the orders. Since the best priced orders on an order book will be used for matching, the electronic match engine 106 does not necessarily require a copy of the order itself. Moreover, since new orders may arrive during any period of time, the system may further check the order book to identify any additional orders. In addition, such an embodiment allows that only possess aggregate book information to take part in the process. For example a customer who only knows the number and quantity of orders present at a price level in an order book may be able to detect and transmit a possible implied without knowing the detailed information about orders on the book. Since the implied spread determination module 138 is running in parallel with the match engine 106, the module 138 may be able to run through greater combinations of orders to determine if an implied spread may be formed.

In yet another example in accordance with various aspects of the disclosure, a user external to the exchange computer system 100, such as a user of a trading terminal 120, 118, 116, may monitor the market and order books to calculate an implied spread. The terminal 120 may send a new order 220 (e.g., an outright order, a synthetic spread order, etc.) to the exchange that uses the implied spread to obtain an advantageous trade price. The new order may be in a recognized format (e.g., the FIX/FAST format) and include information in its message format that facilitates matching by an electronic match engine 106 of the new order 220 with the one or more pending orders. That information may include multiple order book identifiers or other information useful to the match engine 106 to match the order 220. In one embodiment, the order may be marked as "Fill and Kill" or "Fill or Kill;" thus, further reducing the customer's risk by ensuring that the order does not rest on the order book if the implied matching possibility no longer exists.

The match engine 106 may, in some embodiments, verify the information that facilitates matching by confirming the status of pending orders that will be matched against the legs of the implied spread. The exchange computer system 100 may perform the verifying in the match engine 106 itself, or alternatively, delegate this activity to a implied spread determination module 208 where the verifying may occur in a separate thread running in parallel with the match engine 106. If the verification finds the implied spread to be valid, then a notification of the implied spread may be sent to the match engine 106 for executing all of the legs of the implied spread against the pending orders identified in the order 202. At least one advantage of executing all of the legs of the implied spread in a nearly simultaneous manner is that there is miniscule slippage risk to the user. In some embodiments, a limit may be placed on the number of legs that may be submitted in an implied spread in order to guarantee that the legging risk is averted.

The present disclosure has been described herein with reference to specific exemplary embodiments thereof. It will be apparent to those skilled in the art that a person understanding this disclosure may conceive of changes or other embodiments or variations, which utilize the principles of this disclosure without departing from the broader spirit and scope of the disclosure as set forth in the appended claims. For example, the operation of generally determining and executing an implied spread is depicted for illustrative purposes in steps 320, 306, and 316 of FIG. 3. In some embodiments in accordance with various aspects of the disclosure, these aforementioned steps may be illustrated as a single high-level step for determining and executing an implied spread associated with a financial instrument provided by the RFQ processor module 142. One or more of the steps may be optional and may be omitted from various embodiments. For example, in some embodiments locking may be omitted or replaced by a step that performs an equivalent function (i.e., of preventing legging risk).

We claim:

1. An apparatus that reduces slippage risk by distributing computational workload of an electronic match engine in an exchange computer system located in an exchange, the apparatus comprising:
a processor configured to execute computer-executable instructions; and
a memory storing a search list and computer-executable instructions that when executed by the processor cause the apparatus to perform steps comprising:
receiving a request for quote for a financial instrument at time t1, wherein the request for quote includes an inquiry regarding a current market for the financial instrument, and wherein the request for quote does not create an order for the financial instrument at the electronic match engine;
starting a timer at the time t1 to countdown for a predetermined amount of time;
determining that a response to the request for quote has not been received before the timer finishes its countdown;
as a result of determining that a response to the request for quote has not been received before the timer finishes its countdown, determining that the financial instrument is on the search list;
based on a determination that the financial instrument is on the search list, causing an implied spread determination module to determine, by a first processing thread executing the implied spread determination module, if the order for the financial instrument creates an implied spread, the first processing thread executes in parallel with and apart from a second processing thread executing in the electronic match engine, and wherein the implied spread comprises multiple legs, a first leg of the multiple legs corresponding to the order and a second leg of the multiple legs corresponding to a resting order;
causing the second processing thread executing in the electronic match engine to receive from the first processing thread executing the implied spread determination module, a notification of the implied spread, the notification comprising order book identifiers;
executing, by the electronic match engine contemporaneously based on the notification, all the multiple legs of the implied spread without locking a market for the financial instrument of each leg; and
based on a determination by the implied spread determination module that the order for the financial instrument creates an implied spread, sending a response to the request for quote.

2. The apparatus of claim 1, where the sent response to the request for quote includes information created by executing the implied spread created using the financial instrument associated with the request for quote.

3. The apparatus of claim 1, where the search list comprises a plurality of financial instruments to be monitored for implied spreads.

4. The apparatus of claim 1, where the search list is updated based on the determining occurring in the implied spread determination module.

5. The apparatus of claim 1, where the financial instrument is one of a futures contract and an options contract.

6. A method that reduces slippage risk by distributing computational workload of an electronic match engine in an exchange computer system located in an exchange, the method comprising:
receiving, at a request for quote processor module of the exchange computer system at time t1, a request for quote for a financial instrument, wherein the request for quote includes an inquiry regarding the current market for the financial instrument, and wherein the request for quote does not create an order for the financial instrument at the electronic match engine in the exchange computer system;
starting, at the request for quote processor module, a timer at the time t1 to countdown for a predetermined amount of time;
determining, by the request for quote processor module, that a response to the request for quote has not been received before the timer finishes its countdown;
determining, by the request for quote processor module and as a result of the determining that a response to the request for quote has not been received before the timer finishes its countdown, that the financial instrument is on a search list;
causing, by the request for quote processor module and based on a determination that the financial instrument is on the search list, an implied spread determination module to determine, by a first processing thread executing the implied spread determination module, if the order for the financial instrument creates an implied spread, the first processing thread executes in parallel with and apart from a second processing thread executing in the electronic match engine in the exchange computer system, and wherein the implied spread comprises multiple legs, a first leg of the multiple legs corresponding to the order and a second leg of the multiple legs corresponding to a resting order;
causing the second processing thread executing in the electronic match engine to receive from the first processing thread executing the implied spread determination module, a notification of the implied spread, the notification comprising order book identifiers;
executing, by the electronic match engine contemporaneously based on the notification, all the multiple legs of the implied spread without locking a market for the financial instrument of each leg; and
sending, by the request for quote processor module and based on a determination by the implied spread determination module that the order for the financial instrument creates an implied spread, a response to the request for quote.

7. The method of claim 6, wherein the executing all the multiple legs of the implied spread occurs with no slippage risk.

8. The apparatus of claim 1, where the implied spread determination module is configured to stop determining whether an implied spread is created for the financial instrument after a predefined amount of time has expired.

9. A tangible computer-readable medium storing computer-executable instructions that when executed by a processor cause a computing device to perform steps comprising:
receiving, at a request for quote processor module of an exchange computer system at time t1, a request for quote for a financial instrument, wherein the request for quote includes an inquiry regarding the current market for the financial instrument, and wherein the request for quote does not create an order for the financial instrument at an electronic match engine in the exchange computer system;

starting a timer at the time t1 to countdown for a predetermined amount of time;

determining that a response to the request for quote has not been received before the timer finishes its countdown;

as a result of determining that a response to the request for quote has not been received before the timer finishes its countdown, determining that the financial instrument is on a search list;

based on a determination that the financial instrument is on the search list, causing an implied spread determination module, by a first processing thread executing the implied spread determination module, to determine if the order for the financial instrument creates an implied spread, the first processing thread executes in parallel with and apart from a second processing thread executing in the electronic match engine in the exchange computer system, and wherein the implied spread comprises multiple legs, a first leg of the multiple legs corresponding to the order and a second leg of the multiple legs corresponding to a resting order;

causing the second processing thread executing in the electronic match engine to receive from the first processing thread executing the implied spread determination module, a notification of the implied spread, the notification comprising order book identifiers;

executing, by the electronic match engine contemporaneously based on the notification, all the multiple legs of the implied spread without locking a market for the financial instrument of each leg; and based on a determination by the implied spread determination module that the order for the financial instrument creates an implied spread, sending a response to the request for quote.

10. The apparatus of claim 1, wherein the implied spread determination module is communicatively coupled over a computer network with the electronic match engine, and the notification is received over the computer network.

11. The apparatus of claim 1, wherein the first processing thread executing the implied spread determination module is located outside of the exchange.

12. The apparatus of claim 1, wherein the executing all the multiple legs of the implied spread occurs with no slippage risk.

13. The method of claim 6, wherein the search list comprises a plurality of financial instruments to be monitored for implied spreads, the method further comprising:

determining, by the electronic match engine executing in the second processing thread in the exchange computer system, if the order in combination with resting orders for financial instruments in the search list create an implied spread; and dynamically updating the search list based on the determining, which is being performed by the implied spread determination module, occurring in parallel and apart from the electronic match engine.

14. The method of claim 6, wherein the order is a synthetic implied spread order comprising information to facilitate matching by the electronic match engine of the synthetic implied spread order with the resting order, the information comprising the order book identifiers; wherein the determining by the implied spread determination module comprises confirming status of resting orders in order books corresponding to the order book identifiers to facilitate matching.

15. The method of claim 6, wherein the first processing thread executing the implied spread determination module is located outside of the exchange, and wherein the notification of the implied spread is received over a computer network communicatively coupling the implied spread determination module and the electronic match engine.

16. The tangible computer-readable medium of claim 9, wherein the executing all the multiple legs of the implied spread occurs with no slippage risk.

17. The tangible computer-readable medium of claim 9, wherein the implied spread determination module is communicatively coupled over a computer network with the electronic match engine, and the notification is received over the computer network.

* * * * *